United States Patent

Takahashi et al.

[11] Patent Number: 5,929,908
[45] Date of Patent: Jul. 27, 1999

[54] IMAGE SENSING APPARATUS WHICH PERFORMS DYNAMIC RANGE EXPANSION AND IMAGE SENSING METHOD FOR DYNAMIC RANGE EXPANSION

[75] Inventors: Kenji Takahashi, Kawasaki; Yoshiro Udagawa, Saitama-ken; Masato Ikeda, Higashikurume; Eiichiro Ikeda, Tokyo, all of Japan

[73] Assignee: Canon Kabushiki Kaisha, Tokyo, Japan

[21] Appl. No.: 08/594,265

[22] Filed: Jan. 30, 1996

[30] Foreign Application Priority Data

Feb. 3, 1995 [JP] Japan .................................. 7-016924
Mar. 17, 1995 [JP] Japan .................................. 7-058794
Oct. 11, 1995 [JP] Japan .................................. 7-263176

[51] Int. Cl.$^6$ .................................................. H04N 5/238
[52] U.S. Cl. .......................................................... 348/364
[58] Field of Search ..................................... 348/362, 363, 348/364, 365, 366, 207, 229; 382/168, 172; H04N 5/238

[56] References Cited

U.S. PATENT DOCUMENTS 5,144,442  9/1992  Ginosar et al. ........................... 348/364
5,162,914  11/1992  Takahashi et al. .
5,420,635  5/1995  Konishi et al. .
5,671,013  9/1997  Nakao ...................................... 348/234

Primary Examiner—Tuan V. Ho
Attorney, Agent, or Firm—Morgan & Finnegan, L.L.P.

[57] ABSTRACT

An image sensing apparatus which senses an object a plurality of times in different exposures to obtain a plurality of images and makes a single image with a widened dynamic range by processing the plurality of sensed images, generates a histogram of signal levels of an image sensed in a proper exposure by using a histogram generator, automatically decides whether a dynamic range expansion processing is to be processed or not on the basis of the generated histogram by using a dynamic range expansion deciding unit, determines a parameter for sensing another image of the object in an exposure which is different from the proper exposure in accordance with a decision by the dynamic range expansion deciding unit by using a parameter determination unit, and obtains a single image of the object by processing the image sensed in the proper exposure and the image sensed by using the parameter determined by said parameter determination unit an image processing unit. When an image sensing apparatus is not equipped with a photometer, a pre-sensing operation is performed, an image sensed in the pre-sensing operation is analyzed to find a proper exposure, and this image is also used in the dynamic range expansion processing. A part or whole image data of a plurality of images which are obtained as above and necessary for the dynamic range expansion processing are compressed by a compressing unit and the compressed image data is used in the dynamic range expansion processing.

27 Claims, 13 Drawing Sheets

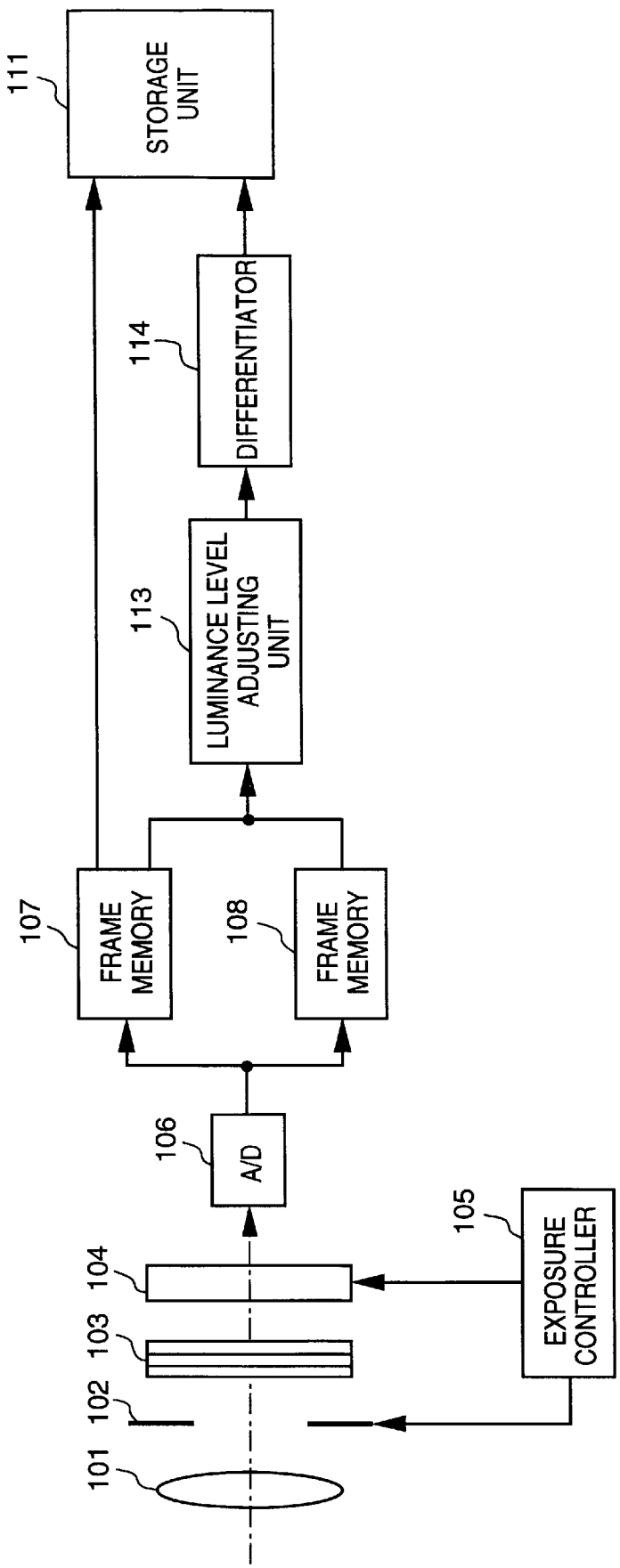

ND IMAGE SENSING METHOD FOR
IMAGE SENSING APPARATUS WHICH PERFORMS DYNAMIC RANGE EXPANSION AND IMAGE SENSING METHOD FOR DYNAMIC RANGE EXPANSION

BACKGROUND OF THE INVENTION

The present invention relates to an image sensing apparatus and method and, more particularly, to an image sensing apparatus and method capable of speeding up and effectively performing an operation for obtaining a single image with a wide dynamic range by processing a plurality of images obtained by sensing an identical scene a plurality of times in different exposures.

Some image sensing apparatuses, such as a video camera, a still video camera, and an electrophotographic camera, use a solid-state electric image sensor, such as a CCD, which generates image signals representing a sensed image. The dynamic range of the solid-state electric image sensing device for incoming light is much narrower than that of silver halide film and the like. Therefore, when a scene to be sensed includes a bright part and a dark part and luminosity difference between them is large, it is very difficult to sense both part in an exposure proper for the solid-state electric image sensing device in a single image sensing operation. In most cases, if the exposure for sensing the scene is adjusted to the dark part of the scene, then the bright part may be expressed in white, and if the exposure is adjusted to the bright part, then the dark part may be expressed in black, for example.

In order to overcome the aforesaid problems, as a method of expanding the dynamic range of a solid-state image sensing device, a technique is proposed in e.g., Japanese Patent Laid-Open No. 63-306778, in which an identical scene is sensed in different exposures to obtain image data of a plurality of sensed images, and the image data of the sensed images is processed in accordance with some predetermined operation to obtain a single image with an expanded dynamic range. Further, Japanese Patent Laid-Open No. 5-64075, titled as "Video Camera, Image Sensing Method Using the Video Camera, and Method of Operating the Video Camera, and Image Sensing Apparatus and Method", proposes a camera and a method for expanding a dynamic range, which senses an identical scene in an exposure that is proper to a dark area of the scene to obtain the first image and in an exposure that is proper to a bright area to obtain the second image, then replaces the image data of the bright area in the first image by the corresponding area in the second image so as to obtain a composite image, and obtains a single image including the dark and bright areas both sensed in the proper exposures.

However, in the aforesaid camera capable of expanding its dynamic range, there were following problems, namely, I. Two images, i.e., the first image obtained when an exposure is adjusted to the dark part of the scene to be sensed and the second image obtained when an exposure is adjusted to the bright part of the scene, are always sensed. Therefore, when a user does not want dynamic range expansion, another image has to be sensed with an exposure adjusted in accordance with the brightness of the entire scene (the image sensed as this is called "standard image", and the exposure adjusted as this is called as "proper exposure", hereinafter), which is troublesome and operation time for sensing an image is long, and a user may miss a shutter chance.

II. If an electrophotographic camera does not have a photometer, the camera has to perform an image sensing operation (called as "pre-sensing operation", hereinafter) just for deciding an exposure for the subsequent image sensing operation. Then, after a proper exposure for obtaining a standard image is determined on the basis of image data obtained in the pre-sensing operation and the used exposure, the second image sensing operation is performed in the proper exposure (called as "main sensing operation", hereinafter). In the above-described image sensing operation, the image data obtained in the pre-sensing operation is used just for determining an exposure to be used in the subsequent image sensing operation, and abandoned thereafter.

In addition, in order to process a plurality of images to obtain a single image with the expanded dynamic range in accordance with the image sensing processing described in the previous paragraph, in order to obtain the plurality of images, it is necessary to determine the proper exposure by performing the pre-sensing operation, then to perform main image sensing operation in the proper, over, and under exposure.

However, as described above, image data obtained in the pre-sensing operation is conventionally used only for photometry, and abandoned thereafter. Consequently, it is necessary to perform image sensing operation at least three times for obtaining a plurality of images (at least two images) in different exposures, which is troublesome and consumes a long time.

Furthermore, since an image is sensed in the pre-sensing operation, and more than two images are sensed in the main sensing operation, there is a time gap between when an image is sensed for the first time and when an image is sensed in the n-th time. Accordingly, a problem arises that images to be processed may be considerably different from each other.

III. Since it is necessary to store a plurality of sensed images to perform the aforesaid dynamic range expansion processing, there is a problem that an amount of image data to be stored is quite large.

SUMMARY OF THE INVENTION

The present invention has been made in consideration of the above situation, and has as its object to provide an image sensing apparatus capable of automatically determining whether it is necessary to perform dynamic range expansion processing or not as well as capable of performing image sensing operation effectively.

According to the present invention, the foregoing object is attained by providing an image sensing apparatus which senses an object a plurality of times in different exposures to obtain a plurality of images and makes a single image with a widened dynamic range by processing the plurality of sensed images, the apparatus comprising: histogram generating means for generating a histogram of signal levels of a first image sensed in a first exposure; deciding means for deciding whether a dynamic range expansion processing is to be processed or not on the basis of the histogram generated by the histogram generating means; parameter determination means for determining a parameter for sensing a second image of the object in a second exposure which is different from the first exposure in accordance with a decision by the deciding means; and image processing means for obtaining a single image of the object by processing the first image and the second image which is sensed by using the parameter determined by the parameter determination means.

With the above configuration, when it is determined that it is not necessary to perform the dynamic range expansion operation, a single scene does not have to be sensed a plurality of times unnecessarily, thereby making the image sensing operation effective.

It is another object of the present invention to provide an image sensing apparatus and method capable of shortening time for image sensing operation for obtaining a single image with expanded dynamic range from a plurality of images sensed in different exposures by using an image sensed for photometry to determine an exposure to be used in the main image sensing operation and to perform the dynamic range expansion processing, as well as capable of making a photometer unnecessary.

The foregoing object of the present invention is attained by providing an image sensing apparatus which senses an object a plurality of times in different exposures to obtain a plurality of images and makes a single image with a widened dynamic range by processing the plurality of sensed images, the apparatus comprising: an image sensor for sensing the object so as to obtain an image and outputting the obtained image; operation means for finding a proper exposure by using a first image sensed in a first image sensing operation and a first exposure used to sense the first image; deciding means for deciding whether a dynamic range expansion processing is to be performed or not; image sensor control means for controlling the image sensor in order to sense a second image in an exposure which is different from the first exposure, on the basis of the proper exposure obtained by the operation means and the first exposure; and image processing means for, depending upon a decision by the deciding means, generating a single image by using the first image and the second image.

With the aforesaid configuration, an image sensed for photometry is also used in the dynamic range expansion processing, thereby obtaining the necessary number of images for dynamic range expansion processing in the less number of image sensing operations, as well as making a photometer unnecessary.

It is another object of the present invention to provide an image sensing apparatus capable of reducing an amount of data to be stored which is used in the dynamic range expansion processing.

The foregoing object of the present invention is attained by providing an image sensing apparatus which senses an object a plurality of times in different exposures to obtain a plurality of images and makes a single image with a widened dynamic range by processing the plurality of sensed images, the apparatus comprising: first compressing means for generating compressed data by compressing image data of an image which is other than a first image that is one of the plurality of images; and storage means for storing image data of the first image and the compressed data of the image which is other than the first image.

In accordance with the present invention as described above, the image sensing apparatus further comprises: area determination means for determining an area which needs to be performed with a dynamic range expansion processing in the first image; and extraction means for extracting an area corresponding to the area determined by the area determination means in the image which is other than the first image, wherein the first compressing means compresses image data of the area extracted by the extraction means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11A is the image sensed by adjusting the exposure so as to be proper to inside of an room, and Fig. 11B is the image sensed by lowering the exposure so that a part of the solid-state image sensor corresponding to an area which is outside of the room is not saturated;

FIG. 15 is a block diagram illustrating a configuration of an image sensing apparatus according to a second modification of the third embodiment.

DETAILED DESCRIPTION OF THE PREFERRED EMBODIMENTS

Preferred embodiments of the present invention will be described in detail in accordance with the accompanying drawings.

<First Embodiment>

Figure 1:
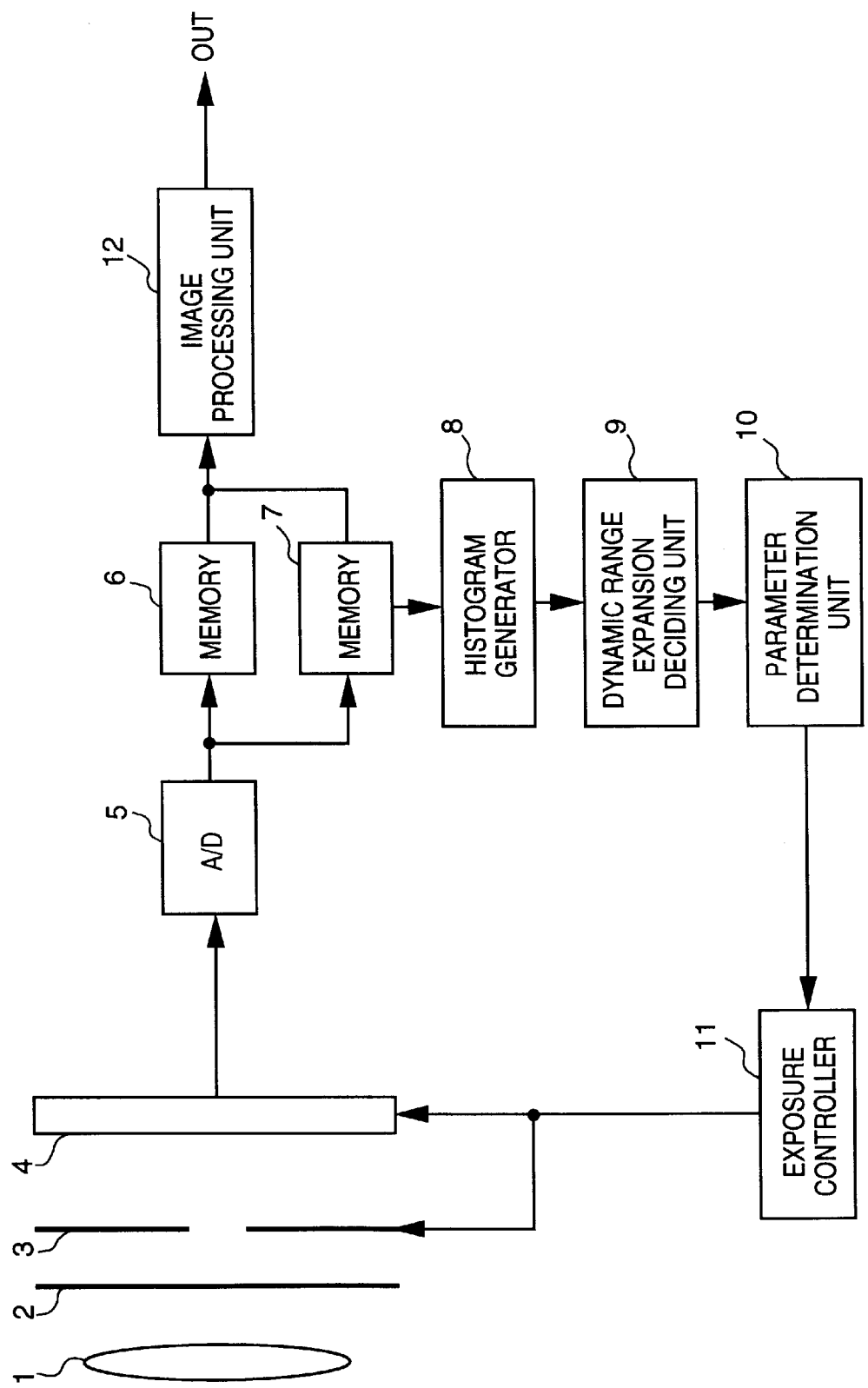
FIG. 1 is a block diagram illustrating a configuration of an image sensing apparatus according to a first embodiment of the present invention.

A first embodiment of the present invention is described below. FIG. 1 is a block diagram illustrating a configuration of an image sensing apparatus according to a first embodiment of the present invention. Referring to FIG. 1, flow of image data and image sensing operation will be described.

Figure 2:
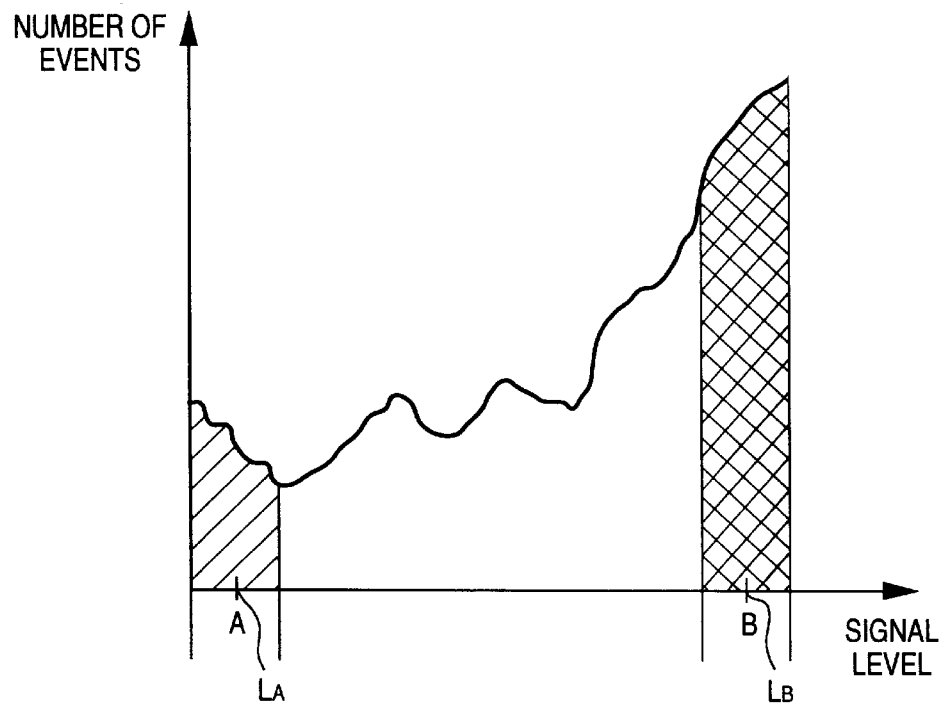
FIG. 2 is a histogram showing signal levels of a standard image and the number of events.

An image of a scene passes through a lens 1, an optical low-pass filter 2, and an iris diaphragm 3, and is formed on photo sensing surface of CCD 4. The iris diaphragm 3 and an exposure period of the CCD 4 (electronic shutter speed) are controlled by an exposure controller 11 on the basis of data from (photometer (not shown) so that the CCD 4 is properly exposed. Analog image data of the first image (standard image) formed on the CCD 4 by sensing the scene in the proper exposure (first exposure), is converted into digital image data by an analog-digital (A/D) converter 5, and stored in a memory 7. The digital image data stored in the memory 7 is sent to a histogram generator 8 where a histogram of the number of event of signal levels of the standard image data, as shown in FIG. 2, is generated.

Thereafter, a dynamic range expansion deciding unit 9 (referred as "deciding unit 9", hereinafter) decides whether a dynamic range expansion processing is to be performed or not on the basis of the generated histogram. This decision is made in accordance with the total numbers of events of signal levels of the standard image data in different ranges A and B which are in high-end and low-end regions of the dynamic range of the image sensing apparatus, and predetermined thresholds of the numbers of events, TA and TB. For example, let the central values of the ranges A and B, LA and LB, respectively, have relationship LA<LB, and let the total numbers of the events of signal levels in the ranges A and B be HA and HB, respectively. Then, if the following condition 1 is satisfied, it is decided that the dynamic range expansion processing is not performed.

HA<TA and HB<TB            Condition 1

If the deciding unit 9 decided not to perform the dynamic range expansion processing, then the standard image data stored in the memory 7 is read and outputted through the image processing unit 12 without changing the standard image data. In contrast, if the deciding unit 9 decided to perform the dynamic range expansion processing, then the parameter determination unit 10 determines parameters, i.e., a value for the iris diaphragm and an electronic shutter speed, for sensing the second image as a non-standard image in the second exposure on the basis of the histogram generated by the histogram generator 8.

For the simplicity sake, the value for the iris diaphragm is kept unchanged since the standard image is sensed, and only the electronic shutter speed is altered in order to obtain the non-standard image. For example, referring to FIG. 2, conditions for performing the dynamic range expansion processing can be divided as follow.

HA<TA and HB>TB            Condition 2

HA>TA and HB<TB            Condition 3

HA>TA and HB>TB            Condition 4

HA<TB and HA<TB            Condition 5

If the condition 2 is satisfied, for instance, it is known that there is a relatively large bright area in the standard image. Accordingly, the electronic shutter speed for sensing a non-standard image (the second image) is determined so that an exposure period in the second image sensing operation is shorter than the exposure period when the standard image is sensed. Similarly, if the condition 3 is satisfied, the electronic shutter speed is determined so that the exposure period for sensing the non-standard image is longer than the exposure period for sensing the standard image so as to adjust the exposure period to the dark part of the standard image. The following table 1 shows ratios of the electronic shutter speed, used for sensing a non-standard image, with respect to the shutter speed used for sensing the standard image in the first embodiment. Note that the ratios of the electronic shutter speed, R, are decided in accordance with a ratio of the total numbers of events of signal levels within the ranges A and B, denoted by HA and HB, respectively, with respect to the threshold values, TA and TB, and SA (=HA/TA) and SB (=HB/TB)

TABLE 1

Electronic Shutter Speed Determination Table

| S | SA(=HA/TA) | SB(=HB/TB) |
|---|---|---|
| 1 ≦ S < 2 | ×2 | ×1/2 |
| 2 ≦ S < 3 | ×4 | ×1/4 |
| S ≧ 3 | ×8 | ×1/8 |

The electronic shutter speed is determined on the basis of the larger value of SA and SB by referring to the table 1. For example, in a case where the condition 4 is satisfied and 1<SA<2 and 2<SB<3, since SB is larger than SA, the electronic shutter speed is determined on the basis of SB. From the table 1, the electronic shutter speed for sensing a non-standard image is determined as ¼ of the shutter speed when the standard image is sensed.

In the method as described above, a non-standard image is sensed and processed with the standard image. In order to sense a plurality of non-standard images, a plurality of electronic shutter speed can be determined on the basis of both SA and SB. For example, if 1 <SA<2 and 2≦SB<3, then the first electrical shutter speed for sensing the first non-standard image can be decided on the basis of SA and is twice as fast as the shutter speed used for sensing the standard image, and the second electrical shutter speed for sensing the 20 second non-standard image can be determined on the basis of SB and is ¼ of the shutter speed used for sensing the standard image.

The value for the iris diaphragm and the determined shutter speed for sensing a non-standard image is sent to the exposure controller 11 which controls the iris diaphragm 3 and the CCD 4, and a non-standard image is obtained. Next, the image data of the non-standard image is analog-digital converted, and the converted image data is stored in a memory 6. The image data stored in the memory 6 and the image data stored in the memory 7 are sent to the image processing unit 12 where these two sets of data are processed and made into a single image with a widened dynamic range.

Figure 4:
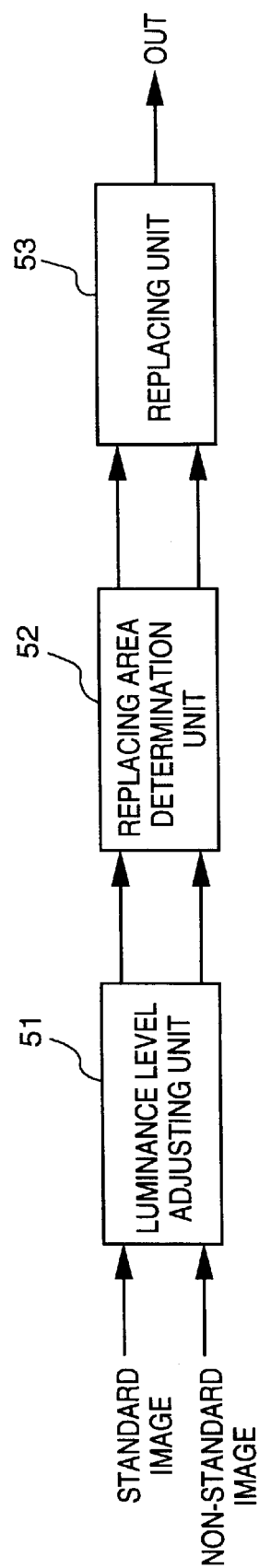
FIG. 4 is a block diagram illustrating a configuration of an image processing unit according to the first embodiment and its modification.

FIG. 4 is a block diagram illustrating a configuration of the image processing unit 12 according to the first embodiment of the present invention.

In FIG. 4, reference numeral 51 denotes a luminance level adjusting unit for changing the luminance level of the non-standard image to match to the luminance level of the standard image; 52, a replacing area determination unit for determining an area to be replaced in the standard image by a corresponding area of the level-adjusted non-standard image; and 53, a replacing unit for replacing the determined area of the standard image by the corresponding area of the non-standard image.

In the first embodiment, the image sensing apparatus decides whether the dynamic range expansion processing is to be performed or not on the basis of the histogram of the signal levels of the standard image, however, a mode with which a user can make the aforesaid decision may be also provided in the image sensing apparatus.

Figure 3:
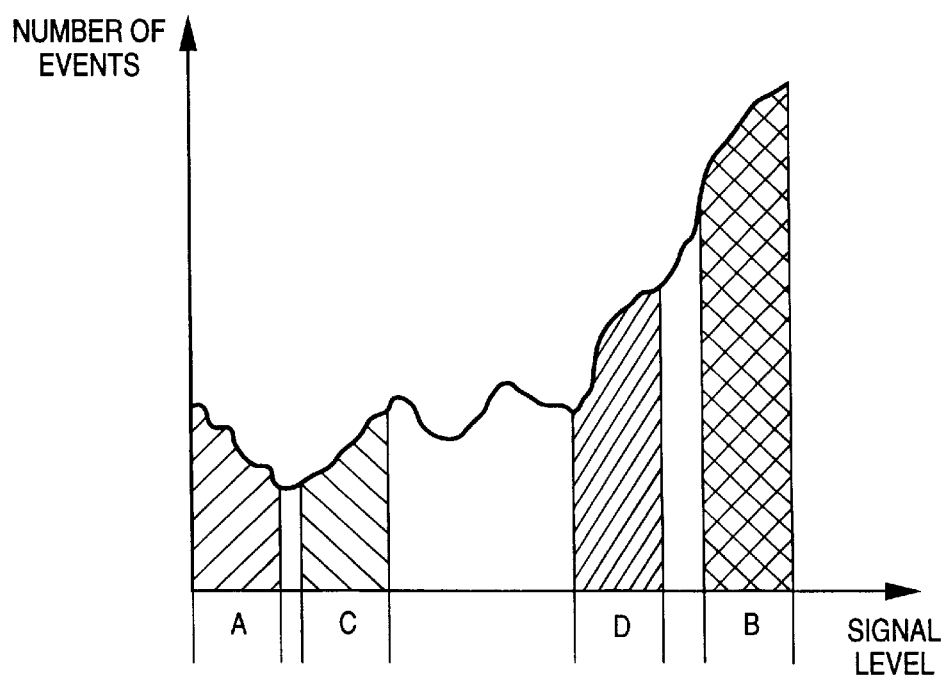
FIG. 3 is another histogram showing signal levels of the standard image and the number of events.

Further, the electronic shutter speed is decided on the basis of the two ranges A and B in the histogram of the signal levels as shown in FIG. 2, however, the present invention is not limited to this. For example, in order to improve analyzing quality of the standard image, the shutter speed can be decided on the basis of more than two different ranges, A to D, as shown in FIG. 3, in the histogram of the signal levels. Furthermore, a mode for which a user can set a value for the iris diaphragm and a shutter speed for sensing a standard image and a non-standard image can be provided in the image sensing apparatus. It is also possible to change the values of the iris diaphragm by the parameter determination unit 10 for sensing a non-standard image.

According to the image sensing apparatus of the first embodiment as described above, a standard image is sensed first, then it is determined whether the dynamic range expansion processing is to be performed or not on the basis of a histogram generated in accordance with the data of the sensed image, and a parameter to be used for sensing a second image is determined when the dynamic range expansion processing is determined to be processed. In other words, the image sensing apparatus automatically decides whether the dynamic range of the first image needs to be expanded or not, and, if it does, the image sensing apparatus senses the second image in an exposure which is adjusted to a bright area or a dark area, or senses two second images in exposures respectively adjusted to bright and dark areas. Thereafter, the image sensing apparatus processes the first image and the second image or images, thereby obtaining a single image with a widened dynamic range when the difference between luminance levels in bright and dark parts of a scene is very large. Further, it is determined that the dynamic range of the first image needs not to be expanded, the first image is directly outputted, thereby shortening time for an image sensing operation.

<Modification of the First Embodiment>

Figure 5:
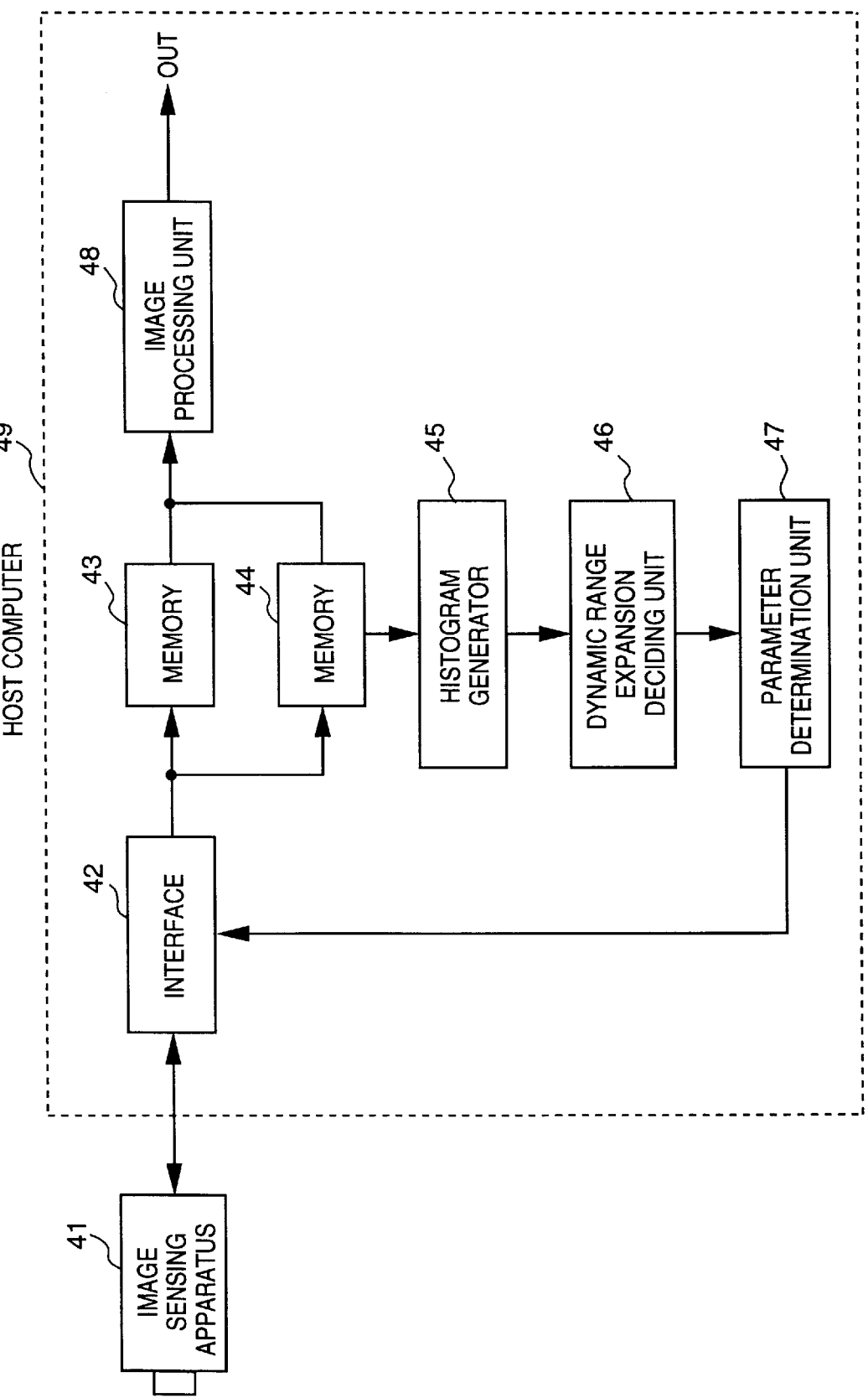
FIG. 5 is a block diagram illustrating an image sensing apparatus and an image processing apparatus according to the modification of the first embodiment of the present invention.

A modification of the first embodiment will be described below. As shown in FIG. 5, the dynamic range expansion processing is performed by using a host computer 49 capable of controlling an image sensing apparatus 41. First, image data of an image sensed with a proper exposure (standard image) sensed by the image sensing apparatus 41 is transmitted to the host computer 49. Then, the image data of the standard image is stored in a memory 44, and a histogram based on the stored image data is generated by a histogram generator 45, similarly to the first embodiment. Next, the generated histogram is sent to a dynamic range expansion deciding unit 46 (referred as "deciding unit 46", hereinafter) which decides whether the dynamic range expansion processing is to be performed or not in accordance with the histogram.

If the deciding unit 46 decided that it is not necessary to perform the dynamic range expansion processing, then the standard image is unprocessed and outputted through an image processing unit 48. In contrast, the deciding unit 46 decided that it is necessary to perform the dynamic range expansion processing, a parameter determination unit 47 determines a value for the iris diaphragm and an electrical shutter speed for sensing a non-standard image in accordance with the generated histogram, as in the first embodiment. The determined value for the iris diaphragm and the electrical shutter speed are transmitted via an interface 42 to the image sensing apparatus 41 which senses a non-standard image by using the transmitted parameters.

Image data of the sensed non-standard image is sent the host computer 49 and stored in a memory 43. The image data of the standard image stored in the memory 44 and the image data of the non-standard image stored in the memory 43 are processed in the image processing unit 48, and made into a single image with a widened dynamic range. The obtained image may be outputted, or may be sent to the image sensing apparatus 41 and stored in a memory or a storage medium provided in the image sensing apparatus, in accordance with a user's choice. The image processing unit 48 has a configuration shown in FIG. 4, for example, as the image processing unit 12 in the first embodiment.

According to the modification of the first embodiment, an image with a widened dynamic range can be obtained, as in the first embodiment, by using an image sensing apparatus which does not have a dynamic range expansion function by connecting it to a host computer capable of performing the dynamic range expansion processing by processing images transmitted from the image sensing apparatus.

It should be noted that, in the first embodiment and its modification, the image sensing apparatus has a photometer, however, it is possible to apply the aforesaid configuration to an image sensing apparatus which does not have a photometer. In such a case, an image to be analyzed for photometry is sensed first (pre-sensing operation), then by controlling an iris diaphragm and an electronic shutter on the basis of the result of the pre-sensing operation, a standard image can be obtained. The decision whether the dynamic range expansion processing is to be performed or not can be made by performing the above operation on the obtained standard image.

<Second Embodiment>

Figure 6:
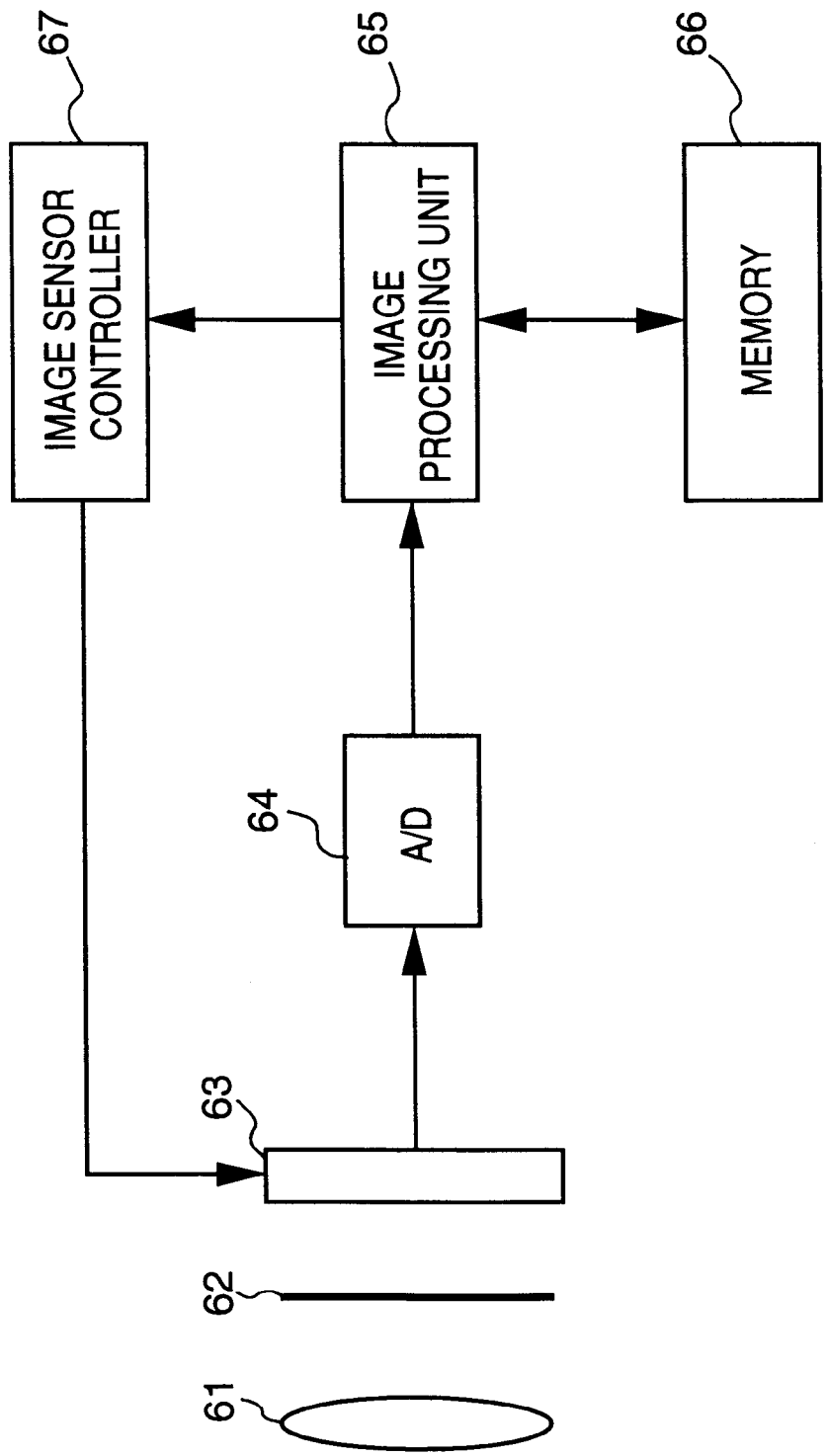
FIG. 6 is a block diagram illustrating a configuration of an image sensing apparatus according to a second embodiment and its modification.
Figure 7A:
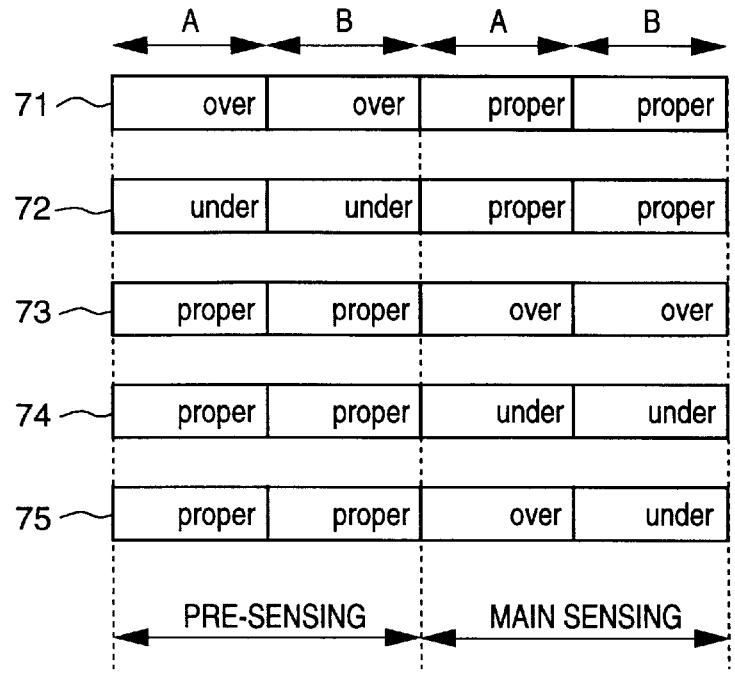
FIGS. 7A and 7B are explanatory charts for explaining sequences of controlling a solid-state image sensor according to the second embodiment.
Figure 7B:
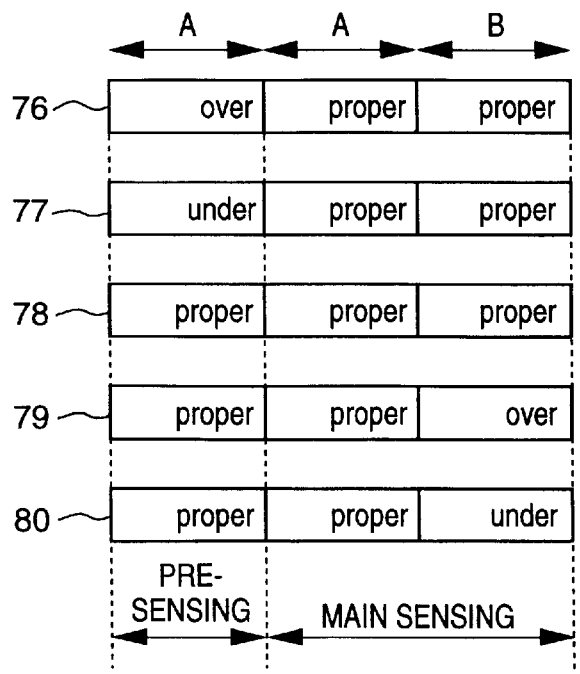

FIG. 6 is a block diagram illustrating a configuration of an image sensing apparatus according to a second embodiment. In FIG. 6, reference numeral 61 denotes a lens; 62, an optical low-pass filter; 63, an image sensor such as CCD; 64, an analog-digital (A/D) converter; 65, an image processing unit; 66, a memory; and 67, an image sensor controller. FIGS. 7A and 7B are explanatory charts for explaining sequences of controlling an image sensor 63 and exposures in the second embodiment.

An operation of the second embodiment will be described below with reference to FIGS. 6, 7A and 7B. First, a pre-sensing operation for sensing a first image used for photometry is performed. In the pre-sensing operation, referring to FIG. 7A, signals in two interlaced fields of the image sensor 63 are outputted. One of the aforesaid two interlaced fields is called A field, and the other is called B field, hereinafter. The image data for photometry outputted from the image sensor 63 is converted into digital image data by the A/D converter 64, and inputted to the image processing unit 65 together with information on the exposure used for sensing the first image (first exposure). The image processing unit 65 decides an exposure to be used in the next image sensing operation by performing calculations based on the inputted digital image data and the first exposure, and sends a signal indicating the decided exposure to the image sensor controller 67. The image sensor controller 67 can control the image sensor 63 in the next image sensing operation in accordance with the decided exposure. The image data of the first image is stored in the memory 66.

Next, a main sensing operation is performed. As shown in FIG. 7A, if the pre-sensing operation is performed in an improper exposure, e.g., the over exposure (71) or in the under exposure (72), the image sensor controller 67 controls the image sensor 63 so that the both images in the A and B fields are to be sensed in the proper exposure in the main sensing operation. In a case where a pre-sensing operation is performed in the proper exposure, the luminance distribution of the entire first image data obtained in the pre-sensing operation is analyzed. As the analyzed result, if the first image is found that it contains a relatively large dark area (73), images in the A and B fields are sensed in an over exposure in the main sensing operation.

In contrast, if the first image is found that it contains a relatively large bright area (74), then images in the A and B fields are sensed in an under exposure in the main sensing operation. Further, if the luminance distribution of the first image shows a proper distribution (75), then an image in the A field is sensed in an over exposure and an image in the B field is sensed in an under exposure. The image data of the A and B fields, outputted from the image sensor 63 is stored in the memory 66 through the image processing unit 65, similarly to the first image sensed in the pre-sensing operation.

In a case where the differences between the exposure used in the pre-sensing operation and the proper exposure is larger than a predetermined value, the dynamic range expansion processing is performed without the image data obtained in the pre-sensing operation. Of course, it is possible to perform the dynamic range expansion processing by using only the image data obtained in the main sensing operation. Further, in a case where a user does not want the dynamic range expansion, the dynamic range expansion processing is not performed, and image data of a single image is made out of image data of two fields which are sensed in both the pre-sensing operation and the main sensing operation in the identical and proper exposure. The image data is converted into luminance signals and color difference signals and outputted.

Further, when the dynamic range expansion processing is to be performed, first, a plurality of images are sensed in different exposures, then by processing image data of these sensed images, a single image with a widened dynamic range is made and outputted. As a dynamic range expansion processing method, methods disclosed in Japanese Patent Laid Open Nos. 7-135569 and 7-131799 or Japanese Patent Application Nos. 6-285067 and 6-285066 (USP 08/559, 074), all of which are applied by the present applicant, can be used.

FIG. 7B shows an example when only image data in the A field of the image sensor 63 is outputted in the pre-sensing operation so as to shorten time consumed in the overall image sensing operation. Referring to FIG. 7B, if the pre-sensing operation of the A field is performed in an improper exposure (76 or 77), both the A and B fields are sensed in the proper exposure in the main sensing operation. Whereas, if the pre-sensing operation is performed in the proper exposure (78~80), in the main sensing operation, the A field is sensed in the proper exposure and the B field is sensed in either the proper, over or under exposure on the basis of the luminance distribution of the first image. Image data of the images sensed as above is transmitted to the image processing unit 65.

In a case where it is not necessary to perform the dynamic range expansion processing, a single image is made from image data of two fields sensed in the identical and proper exposure out of image data of the three fields sensed as above in different exposures. Further, in a case where the dynamic range expansion processing is to be performed, a single image with a widened dynamic range is made by processing the image data of the three fields.

As described above, by processing image data sensed in a proper or improper exposure together with image data for photometry, it is possible to obtain image data of a plurality of images for the dynamic range expansion processing by performing a pre-sensing operation and only a single main sensing operation. Accordingly, the image data for photometry sensed in the pre-sensing operation is not wasted, and an image with a widened dynamic range can be obtained in a short time.

Further, by sensing image data of a single field in the pre-sensing operation as expressed in FIG. 7B, time for the overall image sensing operation can be further shortened.

<Modification of the Second Embodiment>

FIGS. 8A to 8D are explanatory charts for explaining sequences of controlling the image sensor 63 according to a modification of the second embodiment. Note that an image sensing apparatus used in this modification is the same as the one shown in FIG. 6. The feature of the image sensing apparatus of the modification is that image data of three kinds of images, respectively obtained by sensing in proper, over and under exposures, is used in the dynamic range expansion processing so as to cover a wide luminance range spread from a bright area to a dark area of a scene. Further, FIG. 9 is a flowchart showing an operation of the image sensing apparatus according to the modification of the second embodiment.

Referring to FIGS. 8A to 8D and FIG. 9, an operation for obtaining data from the image sensor 63 will be described. First at step S1, a pre-sensing operation is performed, then at step S2, an image obtained in the pre-sensing operation (first image) is stored in the memory 66, and at step S3, a proper exposure is determined. Next at step S4, whether the dynamic range expansion processing is to be performed or not is decided. When it is decided that the dynamic range expansion processing does not need to be performed, the A and B fields are sensed in an exposure shown in FIG. 8C in the main sensing operation at step S5.

Figure 8A:
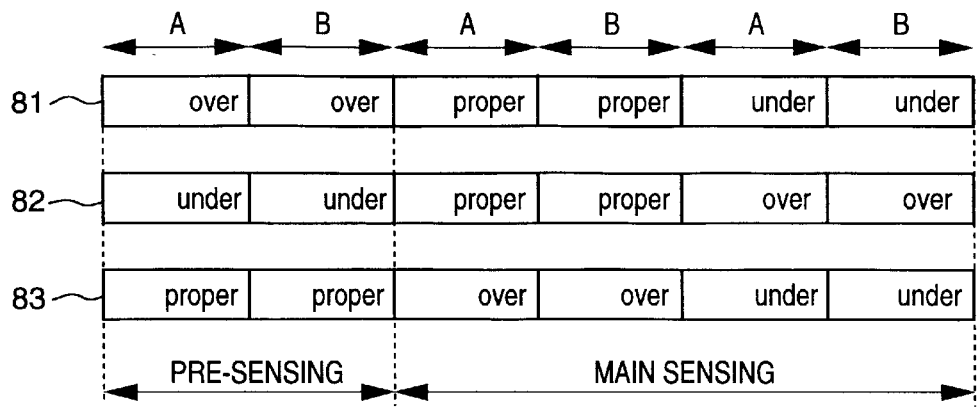
FIGS. 8A to 8D are explanatory charts for explaining sequences of controlling the solid-state image sensor according to the modification of the second embodiment.
Figure 8B:
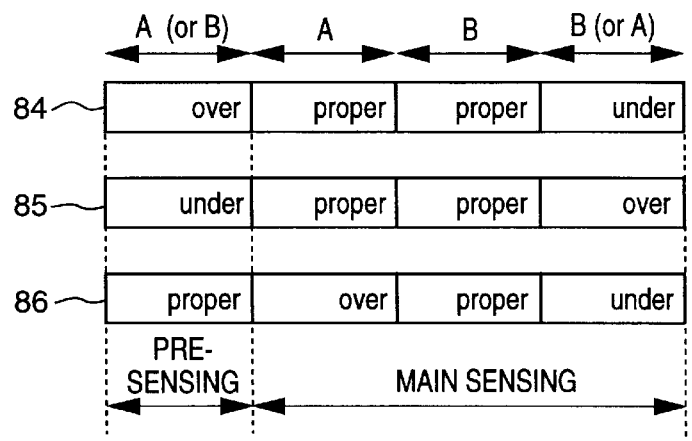
Figure 8C:
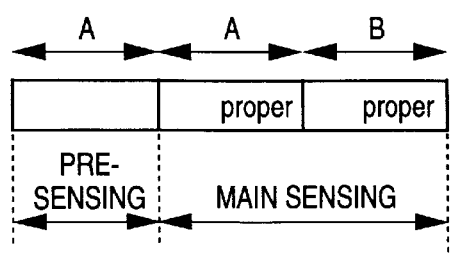
Figure 9:
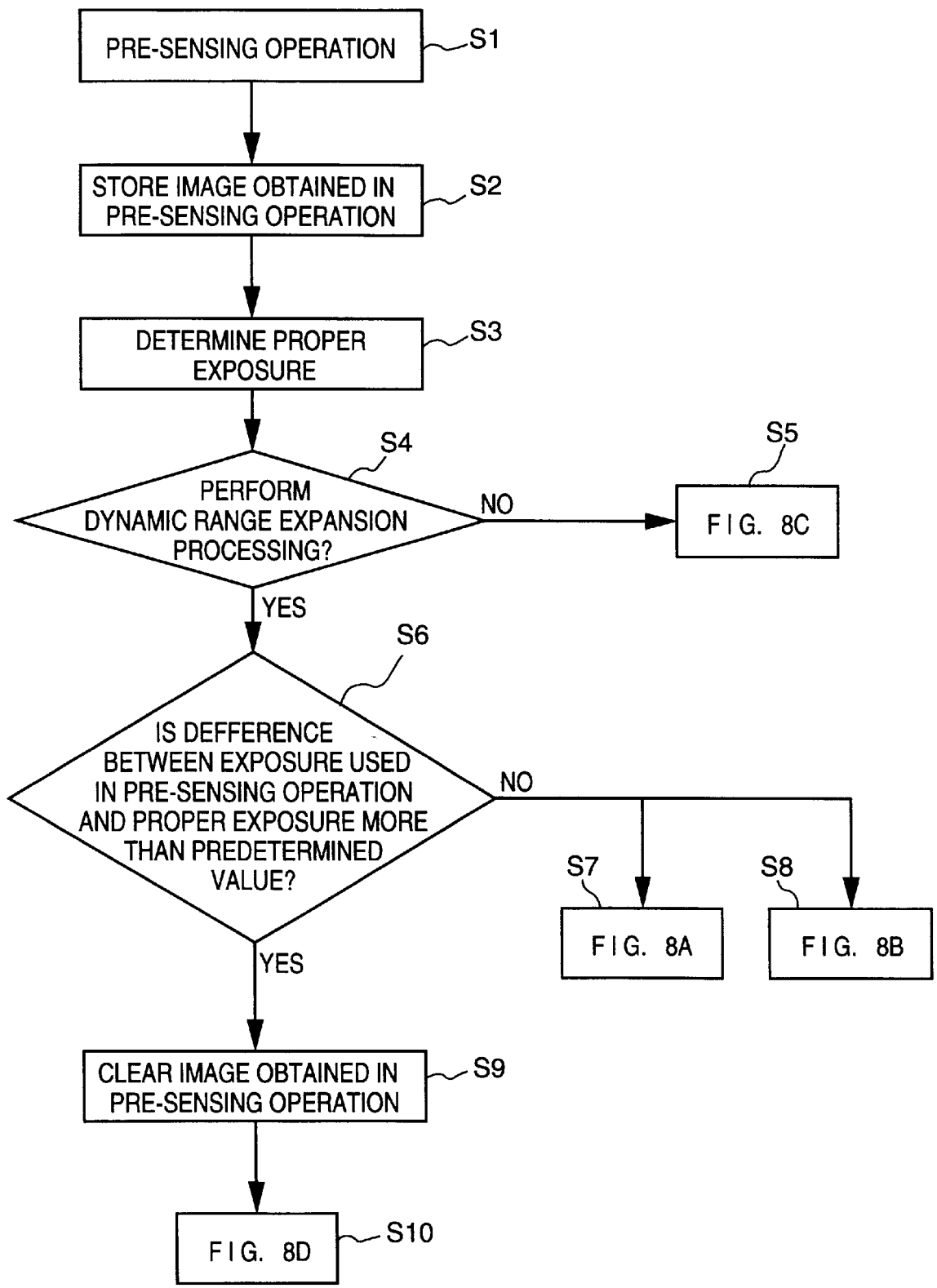
FIG. 9 is a flowchart showing an operation according to the modification of the second embodiment.

Whereas, at step S4, if it is determined that the dynamic range expansion processing is to be performed, the exposure used in the pre-sensing operation (first exposure) is compared to the proper exposure at step S6, and if the difference between the two exposures is under a predetermined value, the scene is sensed in an exposure shown in FIG. 8A at step S7 or in an exposure shown in FIG. 8B at step S8 in the main sensing operation. Referring to FIG. 8A, image data of a single frame (consists of the A and B fields) is outputted from the image sensor 63 for photometry in the pre-sensing operation, thereafter, image data of two frames is outputted in the subsequent main sensing operations. If the first image is sensed in an over exposure (81), image data of two frames are sensed in the proper and under exposures in the main sensing operations. Then, the image data of the three frames obtained as above is processed as in the second embodiment to expand a dynamic range of the image sensing apparatus. Further, if the first image is sensed in an under exposure (82), image data of two frames are sensed in the proper and over exposures. Furthermore, if the first image is sensed in the proper exposure (83), image data of two frames are sensed in an over and under exposures.

FIG. 8B shows an example to shorten time for the overall image sensing operation by sensing an image of either the A or B field in the pre-sensing operation, and image data of three fields, including image data of improper exposure, are obtained in the main sensing operation. In this method, time to perform the overall image sensing operation is shorter by time for obtaining image data of two fields, comparing to the image sensing operation according to FIG. 8A. First, in the pre-sensing operation, image data of the A (or B) field is obtained. If the pre-sensing operation was performed in an over exposure (84), image data of both the A and B fields is obtained in the proper exposure, then image data of the B (or A) field is obtained in an under exposure. In a case where the pre-sensing operation was performed in an under exposure (85), image data of both the A and B fields is obtained in the proper exposure, then image data of the B (or A) field is obtained in an over exposure. If the pre-sensing operation was performed in the proper exposure (86), the next field is sensed in an over exposure, in the proper, then in an under exposures.

Figure 8D:
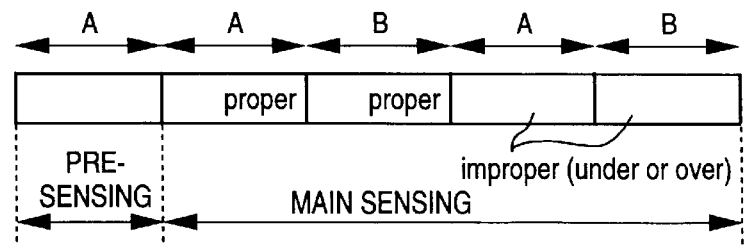

Further, the first exposure is compared to the proper exposure, and if it is determined at step S6 that the difference between the exposures is over a predetermined value, since it is not proper to use the first image data in the dynamic range expansion processing (the first image is too bright or too dark), the image data stored in the memory 66 is deleted at step S9. Thereafter, main sensing operations are performed in the exposures as shown in FIG. 8D at step S10. More specifically, in addition to a standard image (i.e., image sensed in the proper exposure), image data of at least one frame is newly sensed in an improper exposure, then by processing the image data of a plurality of frames, a single image with a widened dynamic range is obtained.

By sensing a scene in the method as described above in accordance with exposures set in the aforesaid sequences, image data for photometry sensed in a pre-sensing operation is not wasted, a plurality of images necessary for the dynamic range expansion processing can be sensed in different exposures by performing the main sensing operations one time less than the conventional image sensing operation, and a single image with a widened dynamic range can be obtained by processing the plurality of sensed images.

According to the second embodiment and its modification as described above, image data for photometry (first image) obtained in a pre-sensing operation and image data sensed in the proper or improper exposure decided in accordance with the first image is used in the dynamic range expansion processing. Therefore, the image data obtained in the pre-sensing operation is not wasted as well as overall image sensing time can be shortened. Especially, in the dynamic range expansion processing performed on the basis of two images sensed in the proper exposure and in the improper exposure, it becomes unnecessary to sense a third image in the main sensing operation.

Further, by obtaining image data of only one field for photometry in a pre-sensing operation and processing the obtained image data with another image data of a frame obtained in the main sensing operation, it is possible to further shorten the overall image sensing time.

<Third Embodiment>

A third embodiment is described below.

Figure 10:
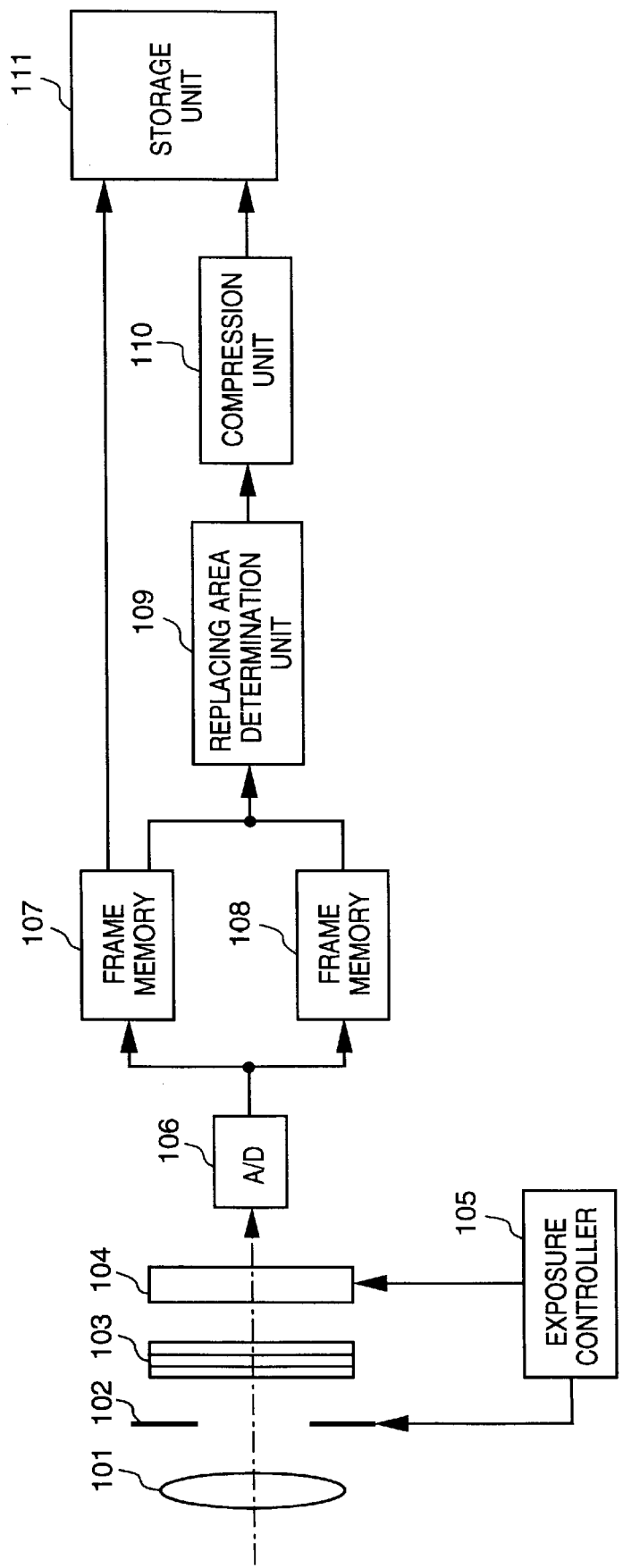
FIG. 10 is a block diagram illustrating a configuration of an image sensing apparatus according to a third embodiment.

FIG. 10 is a block diagram illustrating a configuration of an image sensing apparatus according to the third embodiment. In FIG. 10, reference numeral 101 denotes a lens; 102, an iris diaphragm for adjusting an amount of incoming light; 103, an optical low-pass filter; and 104, a solid-state image sensor such as CCD.

Further, reference numeral 105 denotes an exposure controller for controlling an exposure decided by the value of the iris diaphragm 102 and shutter speed of the solid-state image sensor 104. Reference numeral 106 denotes an A/D converter for converting image data outputted from the solid-state image sensor 104 to digital image data; and 107 and 108 are frame memories for temporarily storing digital image data of a single frame.

Reference numeral 109 denotes a replacing area determination unit for determining areas which is to be processed with dynamic range expansion processing (i.e., bright or dark areas in the image); 110, a compression unit for compressing either image data of a reference image or of an image other than the reference image (non-reference image) which will be explained later, stored in the frame memory 107 or 108; and 111, an storage unit for storing the image data of the reference image and the non-reference image.

Next, the operation of the third embodiment will be described. First, an image of an scene passes through the lens 101, the iris diaphragm 102, and the optical low-pass filter 103, and is formed on a photo sensing surface of the solid-state image sensor 104. At this time, the exposure controller 105 controls the iris diaphragm 102 and the solid-state image sensor 104 so that a single scene is sensed a plurality of times in different exposures.

A plurality of images of the scene each of which is formed on the solid-state image sensor 104 in each image sensing operation are photo-electric converted and outputted as image data, and further analog-digital converted by the A/D converter 106. Then the digital image data of the plurality of images obtained as above is temporarily stored in the frame memories 107 and 108.

Figure 11A:
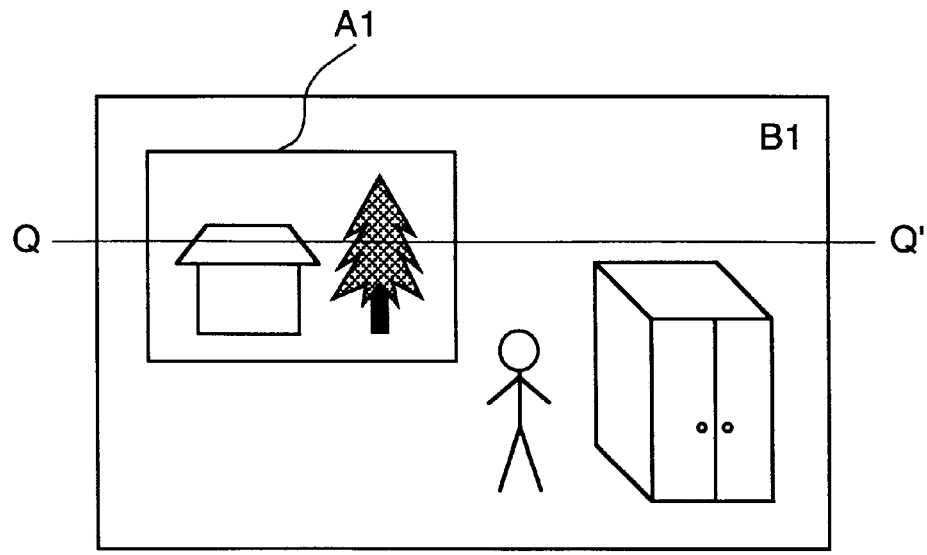
FIGS. 11A and 11B are two images obtained by sensing an identical scene in different exposures, especially.
Figure 11B:
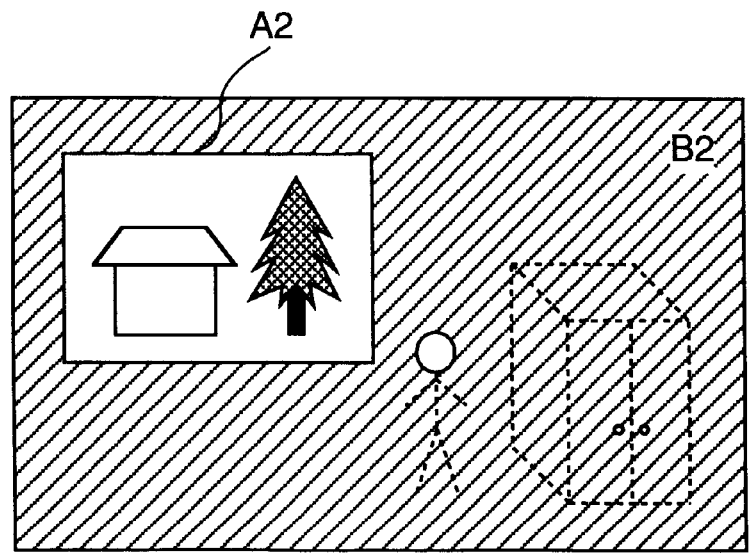

Examples of images sensed by the solid-state image sensor 104 are shown in FIGS. 11A and 11B. FIGS. 11A and 11B are two images obtained by sensing an identical scene of the inside of a room having a window in different exposures.

FIG. 11A shows an image obtained by sensing the room so that the area B1 (inside of the room) is sensed in the proper exposure. In this image, the area A1 (outside scenery through the window) is much brighter than the area B1 (inside of the room), and the dynamic range of the solid-state image sensor 104 is too narrow to properly express the both areas. As a result, the area B1 (inside of the room) is sensed in proper exposure, whereas, the most brightest part of the area A1 (outside scenery through the window) is so bright that the corresponding part of the solid-state image sensor 104 is saturated and the parts are expressed in white.

FIG. 11B is an image obtained by sensing the identical scene in a low exposure so that the scenery of the outside of the room is not expressed in white. In this image, the area A2 (outside scenery through the window) is sensed in proper exposure, however, the area B2 (inside of the room) is expressed darker than the corresponding area shown in FIG. 11B.

Now, assuming that image data shown in FIG. 11A is stored in the frame memory 107 and image data in Fig. 11B is stored in the frame memory 108, and letting the image data stored in the frame memory 107 be of a reference image, and the image data stored in the frame memory 108 be of a non-reference image.

Conventionally, two whole images shown in FIGS. 11A and 11B are necessary for obtaining an image with a widened dynamic range. In contrast, in the third embodiment, the image data of the whole image shown in FIG. 11A (reference image) and image data of the area A2 in the image shown in FIG. 11B (non-reference image) are needed, and image data of the area B2 is unnecessary for the dynamic range expansion processing.

In other words, by replacing the image data of the area A1 of the reference image shown in FIG. 11B by the image data of the area A2 of the non-reference image shown in FIG. 11B, an image expressing both the bright and dark areas in proper exposure can be obtained. As described above, the replacing area determination unit 109 determines image data of an area which needs to be processed with the dynamic range expansion processing.

Figures 12, 13:
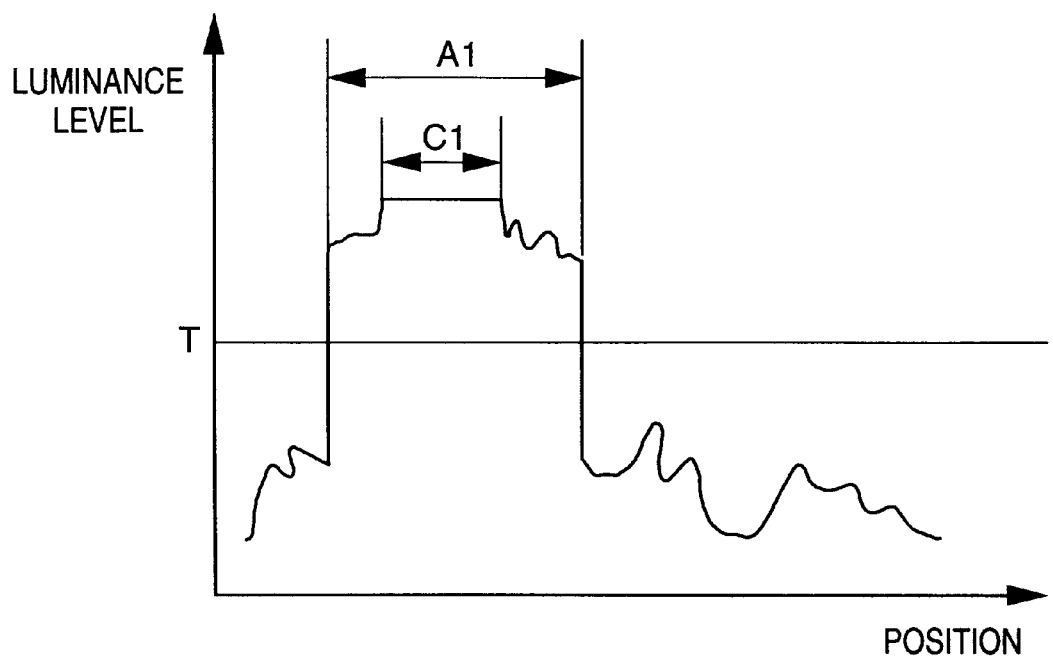
FIG. 12 is a graph showing luminance level along with a horizontal line of the image shown in FIG. 11A.
FIG. 13 is an example of dividing an image used in dynamic range expansion processing into predetermined sized areas each of which is a unit subjected for determining whether or not the area is needed to be performed with dynamic range expansion processing.

FIG. 12 is a graph showing luminance levels of the reference image data shown in FIG. 11A with respect to a horizontal line, e.g., the line Q–Q'. As seen in FIG. 12, in the area A1 which shows an outside scenery from the window brighter than the inside of the room, the solid-state image sensor 104 corresponding to the most brightest part (C1) is saturated.

The determination unit 109 determines an area whose luminance level is over a predetermined threshold T so as to extract bright areas where the solid-state image sensor 104 is saturated and the dynamic range expansion is necessary in the reference image. Then, the area A2 in the non-reference image corresponding to the determined area A1 in the reference image is determined as the area which needs to be processed with the dynamic range expansion processing.

Next, the compression unit 110 picks up the image data of the area A2 determined by the determination unit 109 out of the entire image data of the non-reference image, compresses the picked image data to generate compressed data. Then, the storage unit 111 stores the image data of the reference image and the compressed data as necessary data for the dynamic range expansion processing. At this time, information on exposure conditions (values of the iris diaphragm and shutter speed) used for sensing the reference image and the non-reference image, and information on the picked image data (e.g., a position of the picked-up area from the non-reference image), are also stored with the compressed data.

Note that as a method of picking up an area to be used in the dynamic range expansion processing from the non-reference image, the following method can be used. As shown in FIG. 13, sensed images are divided by n in the vertical direction and by m in the horizontal direction in advance, so as to obtain areas, $w_{11}$ to $w_{nm}$.

Then, the determination unit 109 finds an area, $w_{ij}$ ($1 \leq i \leq n$, $1 \leq j \leq m$), including more than a predetermined number of pixels whose luminance levels are over a predetermined value, and determines that the area is needed to be performed with the dynamic range expansion processing.

In the aforesaid example, the image shown in FIG. 11A is dealt with as the reference image and the image shown in FIG. 11B is dealt with as the non-reference image. However, it is possible to use the image shown in FIG. 11B as the reference image and the image shown in FIG. 11A as the non-reference image in the aforesaid dynamic range expansion processing.

In such a case, the area B2, in the reference image shown in FIG. 11B, whose luminance level is under a predetermined threshold is determined, then the image data of the area B1 in the non-reference image shown in FIG. 11A corresponding to the area B2 is picked up, and compressed image data of the picked image data of the area B1 is generated. Thereafter, the compressed data of the area B1 and the image data of the entire reference image are stored as necessary data for the dynamic range expansion processing.

According to the third embodiment as described above, it does not have to store entire image data of a plurality of sensed images, and image data of a reference image and compressed data, in a non-reference image, obtained by compressing picked image data of an area corresponding to an area, in the reference image, which needs to be processed with the dynamic range expansion processing. Therefore, it is possible to greatly reduce an amount of data to be stored as necessary data for the dynamic range expansion processing. In this case, since only a part of image data of the non-reference image is compressed and stored, an amount of data to be stored is reduced comparing to the case of compressing the entire image data of the non-reference image.

<First Modification of the Third Embodiment>

The first modification of the third embodiment will be described below with reference to FIG. 14.

Figure 14:
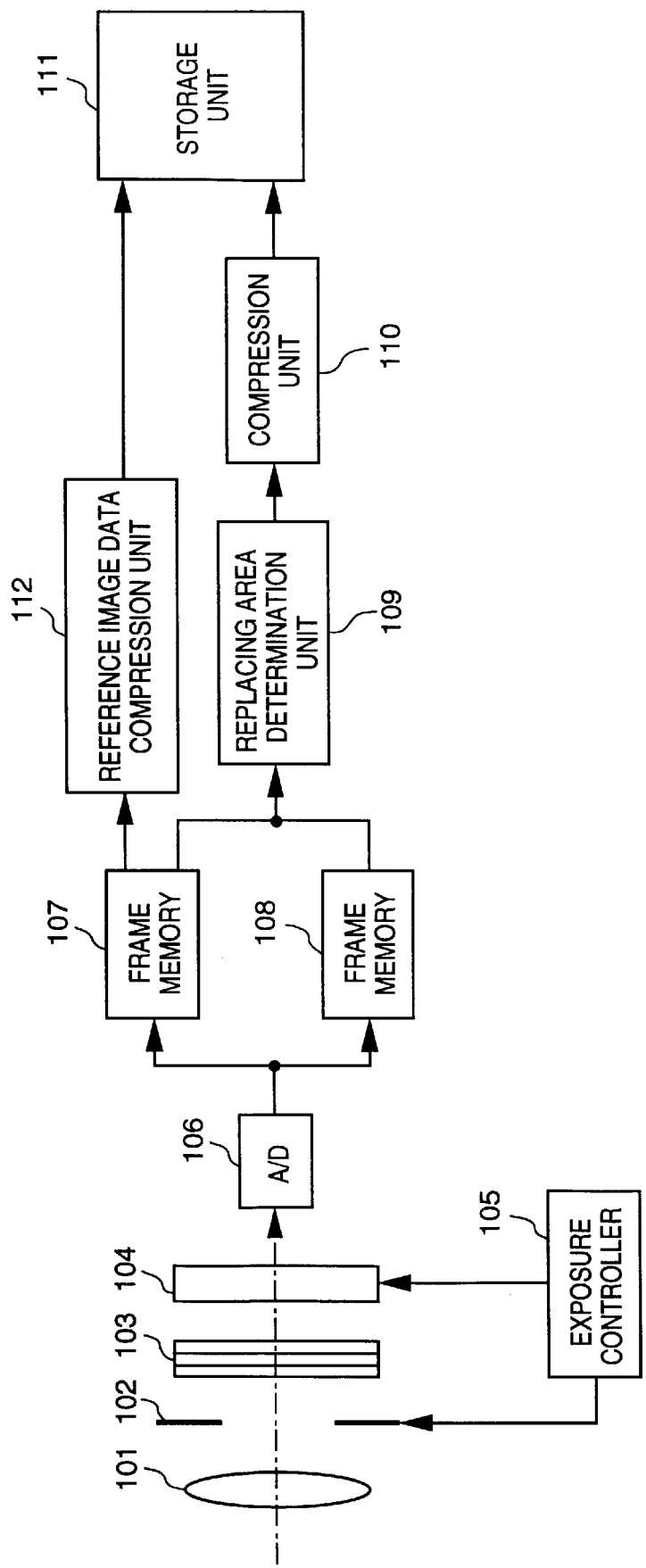
FIG. 14 is a block diagram illustrating a configuration of an image sensing apparatus according to a first modification of the third embodiment.

In FIG. 14, the same units and elements as those in FIG. 10 are referred by the same reference numerals, and explanations of those are omitted. In FIG. 14, reference numeral 112 denotes a reference image data compression unit for compressing image data of a reference image. With the configuration shown in FIG. 14, instead of storing image data of a reference image, compressed reference image data generated by compressing the data of the reference image with the reference image data compression unit 112 is stored. Accordingly, it is possible to further reduce an amount of data to be stored as necessary data for dynamic range expansion processing.

Note that in the above-described third embodiment and its first modification, two images obtained by sensing a scene in different exposures are used to obtain a single image of a widened dynamic range, however, the present invention is not limited to this. For example, it is possible to apply the present invention to a case where more than two images are sensed in different exposures, i.e., a case where a plurality of non-reference images are sensed.

Further, by letting an image sensed in a proper exposure (standard image) be a reference image, when a single image with a widened dynamic range is produced, since it does not have to reproduce the standard image from compressed data, it is easy to process data of a plurality of images to form a single image.

Furthermore, in the third embodiment and its first modification, an area which is necessary for dynamic range expansion processing is picked up from a non-reference image and compressed data of the picked-up area is generated, then the compressed data and the image data of the reference image are stored as data necessary for the dynamic range expansion processing, however, the present invention is not limited to this.

For example, the image data picked up from the non-reference image may be stored without being compressed, or image data of areas which need to be processed with the dynamic range expansion processing in both the reference and non-reference images may be picked up and stored after being compressed or uncompressed. In either case, it is possible to reduce an amount of data to be stored for the dynamic range expansion processing than usual.

<Second Modification of the Third Embodiment>

Next, a second modification of the third embodiment will be described. In the second modification, differential data between a reference image and a non-reference image is stored as compressed data. FIG. 15 is a block diagram illustrating a configuration of an image sensing apparatus according to the second modification of the third embodiment, and the same unit and elements as those in FIG. 10 are referred by the same reference numerals and explanations of those are omitted.

In FIG. 15, reference numeral 113 denotes a luminance level adjusting unit for adjusting the luminance levels of a reference image and a non-reference image. Further, reference numeral 114 denotes a differentiator for generating differential data for each pixel from image data stored in the frame memory 107 and image data stored in the frame memory 108.

A part of an operation using the above-described image sensing apparatus, which is different from the operation described in the third embodiment will be explained below. First, assume that the frame memory 107 stores image data of the reference image shown in FIG. 11A, and the frame memory 108 stores image data of the non-reference image shown in FIG. 11B.

Under the above condition, the luminance level adjusting unit 113 adjusts luminance levels of the reference image stored in the frame memory 107 and the non-reference image stored in the frame memory 108. Thereafter, the differentiator 114 generates the differential data, i.e., compressed data, for each pixel from corresponding pixels of the reference image and the non-reference image.

For example, if the non-reference image is sensed in half of the exposure used to sense the reference image, and if the luminance level of the area B2 (inside of the room) in the non-reference image shown in FIG. 11B is half of the luminance level of the area B1 (inside of the room) in the reference image, then the luminance level of the image data of the non-reference image is doubled by the luminance level adjusting unit 113, then differential data for each pixel is generated by the differentiator 114.

Then the image data of the reference image and the above compressed data as necessary data for the dynamic range expansion processing is stored in a not-shown storage medium by the storage unit 111. At this time, information on exposure conditions (values of the iris diaphragm and shutter speed) for sensing the reference image and the non-reference image, and information on a condition for level adjusting for generating the differential data, and the like, are also stored with the compressed data.

According to the second modification of the third embodiment as described above, the image data of all the plurality of images necessary for the dynamic range expansion processing is not stored, but image data of a single reference image and compressed data generated from the difference between the reference image and a non-reference image is stored, thereby greatly reducing the amount of data to be stored for the dynamic range expansion processing.

Furthermore, according to the second modification of the third embodiment, differential data is generated after luminance levels of a reference image and a non-reference image are adjusted, thus it is possible to greatly increase data compression ratio comparing to a case of generating the differential data without adjusting luminance levels of the reference image and the non-reference image.

The present invention can be applied to a system constituted by a plurality of devices, or to an apparatus comprising a single device. Furthermore the invention is applicable also to a case where the object of the invention is attained by supplying a program to a system or apparatus.

The present invention is not limited to the above embodiments and various changes and modifications can be made within the spirit and scope of the present invention. Therefore to appraise the public of the scope of the present invention, the following claims are made.

What is claimed is:

1. An image sensing apparatus which sense an object a plurality of times in different exposures to obtain a plurality of images and makes a single image with a widened dynamic range by processing the plurality of sensed images, said apparatus comprising:

histogram generating means for generating a histogram of signal levels of a first image sensed in a first exposure;

deciding means for deciding whether a dynamic range expansion processing is to be processed or not on the basis of the histogram generated by said histogram generating means;

parameter determination means for determining a plurality of parameters for sensing a plurality of images of the object in exposures which are different from the first exposure and from each other; and image processing means for processing the first image and the plurality of images sensed by using the determined parameters to obtain a single image of the object.

2. The image sensing apparatus according to claim 1, wherein, when said deciding means decides to perform the dynamic range expansion processing, said parameter determination means determines a parameter and said image processing means processes the first image and the plurality of images.

3. The image sensing apparatus according to claim 1, wherein, when said deciding means decides not to perform the dynamic range expansion processing, said parameter determination means does not determines a parameter, the plurality of images are not sensed, and said image processing means outputs the first image.

4. The image sensing apparatus according to claim 1, wherein said deciding means decides whether the dynamic range expansion is to be performed or not be comparing at least one total number of events occurred in at least one predetermined range of the signal levels in the histogram generated by said histogram generating means to a threshold predetermined by a range of the signal levels.

5. The image sensing apparatus according to claim 1, wherein a parameter used for decision by said deciding means whether the dynamic range expansion processing is to be performed or not is set by a user.

6. The image sensing apparatus according to claim 1, wherein said parameter determination means determines a number of images to be sensed in different exposures which are different from the first exposure and parameters for sensing the images on the basis of at least one total number of events in at least one predetermined range of the signal levels in the histogram.

7. An image sensing apparatus which sense an object a plurality of times in different exposures to obtain a plurality of images and makes a single image with a widened dynamic range by processing the plurality of sensed images, said apparatus comprising:

histogram generating means for generating a histogram of signal levels of a first image sensed in a first exposure;

deciding means for deciding whether a dynamic range expansion is to be performed or not by comparing at least one total number of events occurred in at least one predetermined range of the signal levels in the histogram generated by said histogram generating means to a threshold predetermined by a range of the signal levels;

parameter determination means for determining a parameter for sensing a second image of the object in a second exposure which is different from the first exposure in accordance with a decision by said deciding means; and image processing means for obtaining a single image of the object by processing the first image and the second image which is sensed by using the parameter determined by said parameter determination means.

8. An image sensing apparatus which sense an object a plurality of times in different exposures to obtain a plurality of images and makes a single image with a widened dynamic range by processing the plurality of sensed images, said apparatus comprising:

histogram generating means for generating a histogram of signal levels of a first image sensed in a first exposure;

deciding means for deciding whether a dynamic range expansion processing is to be processed or not on the basis of the histogram generated by said histogram generating means and a parameter indicating whether the dynamic range expansion processing is to be performed which is set by a user;

parameter determination means for determining a parameter for sensing a second image of the object in a second exposure which is different from the first exposure in accordance with a decision by said deciding means; and image processing means for obtaining a single image of the object by processing the first image and the second image which is sensed by using the parameter determined by said parameter determination means.

9. An image sensing apparatus which sense an object a plurality of times in different exposures to obtain a plurality of images and makes a single image with a widened dynamic range by processing the plurality of sensed images, said apparatus comprising:

histogram generating means for generating a histogram of signal levels of a first image sensed in a first exposure;

deciding means for deciding whether a dynamic range expansion processing is to be processed or not on the basis of the histogram generated by said histogram generating means;

parameter determination means for determining a number of images to be sensed in different exposures which are different from the first exposure and parameters for sensing the images on the basis of at least one total number of events in at least one predetermined range of the signal levels in the histogram; and image processing means for obtaining a single image of the object by processing the first image and the images which are sensed in different exposures by using the parameters determined by said parameter determination means.

10. The image sensing apparatus according to claim 9, wherein a user sets the number of the images to be sensed in different exposures which is different from the first exposure and the parameters used for sensing the images instead of the parameter determination means.

11. An image processing apparatus which makes a single image with a widened dynamic range by processing a plurality of images obtained by sensing an object a plurality of times in different exposures, said apparatus comprising:

an interface for receiving the plurality of images;

histogram generating means for generating a histogram of signal levels of a first image out of the plurality of received images which is sensed in a first exposure;

deciding means for deciding whether a dynamic range expansion processing is to be processed or not on the basis of the histogram generated by said histogram generating means;

parameter determination means for determining a plurality of parameters for sensing a plurality of images of the object in exposures which are different from the first exposure and from each other in accordance with a decision by said deciding means; and image processing means for processing the first image and the plurality of images sensed by using the determined parameters to obtain a single image of the object.

12. The image processing apparatus according to claim 11, wherein said image processing apparatus is used by connecting to an image sensing apparatus.

13. An image sensing method of sensing an object a plurality of times in different exposures to obtain a plurality of images and making a single image with a widened dynamic range by processing the plurality of sensed images, said method comprising:

a histogram generating step of generating a histogram of signal levels of a first image sensed in a first exposure;

a deciding step of deciding whether a dynamic range expansion processing is to be performed on the basis of the histogram generated at said histogram generating step;

a parameter determination step of determining a plurality of parameters for sensing a plurality of images of the object in exposures which are different from the first exposure and from each other in accordance with a decision at said deciding step; and an image processing step of processing the first image and the plurality of images sensed by using the determined parameters to obtain a single image of the object.

14. An image sensing apparatus which senses an object a plurality of times in different exposures to obtain a plurality of images and makes a single image with a widened dynamic range by processing the plurality of sensed images, said apparatus comprising:

an image sensor for sensing the object so as to obtain an image and outputting the obtained image;

operation means for finding a proper exposure by using a first image sensed in a first image sensing operation and a first exposure used to sense the first image;

deciding means for deciding whether a dynamic range expansion processing is to be performed;

image sensor control means for controlling said image sensor to sense a second image and a third image so that the first, second, and third images are sensed in proper, over, and under exposures on the basis of the proper exposure obtained by said operation means and the first exposure; and image processing means for, depending upon a decision by said deciding means, generating a single image by using the first, second and third images.

15. The image sensing apparatus according to claim 14, wherein said image processing means generates the single image without using the first image when a difference between the first exposure and the proper exposure obtained by said operation means is over a predetermined value.

16. The image sensing apparatus according to claim 14, wherein the first image obtained in the first image sensing operation is of one frame.

17. The image sensing apparatus according to claim 14, wherein the first image obtained in the first image sensing operation is of one field.

18. The image sensing apparatus according to claim 14, wherein, when the first exposure is the proper exposure obtained by said operation means, said image sensor control means controls the image sensor so as to sense the second image in the second exposure which is different form the first exposure and which is decided on the basis of luminance distribution of the first image.

19. The image sensing apparatus according to claim 14, wherein said image sensor control means controls said image sensor so that it senses an image by frame in an exposure which is different from the first exposure.

20. The image sensing apparatus according to claim 14, wherein said image sensor control means controls said image sensor so that it senses an image by field in an exposure which is different from the first exposure.

21. An image sensing method of sensing an object a plurality of times in different exposures to obtain a plurality of images and making a single image with a widened dynamic range by processing the plurality of sensed images, said method comprising:

a first image sensing step of sensing a first image of the object and outputting the first image;

an operation step of finding a proper exposure by using the first image sensed at the first image sensing step and a first exposure used to sense the first image;

a deciding step of deciding whether a dynamic range expansion processing is to be performed;

a second image sensing step of sensing a second image and a third image so that the first, second, and third images are sensed in proper, over, and under exposures on the basis of the proper exposure obtained at said operation step and the first exposure; and an image processing step of, depending upon a decision at said deciding step, generating a single image by using the first, second and third images.

22. The image sensing method according to claim 21, wherein, at said image processing step, the single image is generated without using the first image when a difference between the first exposure and the proper exposure obtained at said operation step is over a predetermined value.

23. The image sensing method according to claim 21, wherein the first image obtained at the first image sensing step is of one frame.

24. The image sensing method according to claim 21, wherein the first image obtained at the first image sensing step is of one field.

25. The image sensing method according to claim 21, wherein, when the first exposure is the proper exposure obtained at said operation step, at said second image sensing step, the second image is sensed in the second exposure which is different from the first exposure and which is decided on the basis of luminance distribution of the first image.

26. The image sensing method according to claim 21, wherein, at said second image sensing step, the second image is sensed by frame in the second exposure which is different from the first exposure.

27. The image sensing method according to claim 21, wherein, at said second image sensing step, the second image is sensed by field in the second exposure which is different from the first exposure.

* * * * *